United States Patent
Sakurada et al.

(10) Patent No.: US 11,620,699 B2
(45) Date of Patent: Apr. 4, 2023

(54) INFORMATION PROCESSING APPARATUS, INFORMATION PROCESSING METHOD, AND NON-TRANSITORY STORAGE MEDIUM

(71) Applicant: TOYOTA JIDOSHA KABUSHIKI KAISHA, Toyota (JP)

(72) Inventors: Shin Sakurada, Toyota (JP); Kazuya Nishimura, Toyota (JP); Masaru Ando, Seto (JP); Toshinari Honda, Anjo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 33 days.

(21) Appl. No.: 17/212,200

(22) Filed: Mar. 25, 2021

(65) Prior Publication Data

US 2021/0334894 A1  Oct. 28, 2021

(30) Foreign Application Priority Data

Apr. 23, 2020 (JP) .............................. JP2020-076699

(51) Int. Cl.
G06Q 30/00 (2023.01)
G06Q 30/0645 (2023.01)
G06Q 50/30 (2012.01)
G06Q 10/1093 (2023.01)
G06Q 30/0207 (2023.01)

(52) U.S. Cl.
CPC ..... *G06Q 30/0645* (2013.01); *G06Q 10/1093* (2013.01); *G06Q 30/0207* (2013.01); *G06Q 50/30* (2013.01)

(58) Field of Classification Search
None
See application file for complete search history.

(56) References Cited

U.S. PATENT DOCUMENTS

| | | |
|---|---|---|
| 2004/0193440 A1 | 9/2004 | Mawatari |
| 2017/0316535 A1* | 11/2017 | Hirose .................. G06Q 10/02 |
| 2019/0295005 A1* | 9/2019 | Griffin .................. G06Q 50/30 |
| 2020/0327466 A1* | 10/2020 | Noda .................. G06Q 10/0833 |

FOREIGN PATENT DOCUMENTS

JP    2004-295392 A    10/2004

* cited by examiner

*Primary Examiner* — Naresh Vig
(74) *Attorney, Agent, or Firm* — Sughrue Mion, PLLC

(57) ABSTRACT

In a system for renting vehicles to users, the operation rate of the vehicles is improved. An information processing apparatus for managing the rental of vehicles to users is configured to perform: generating a rental schedule of a vehicle for a first user; obtaining demand data related to a demand for the vehicle; and changing, based on the demand data, a vehicle return point included in the rental schedule, the vehicle return point being a point at which the first user returns the vehicle.

18 Claims, 10 Drawing Sheets

RESERVATION MANAGEMENT DATA

| RESERVATION ID | RENTAL DATE AND TIME | RETURN DATE AND TIME | USER ID | DEPARTURE POINT | RETURN POINT | VEHICLE ID |
|---|---|---|---|---|---|---|
| R001 | ... | ... | U001 | H001 | H001 | V001 |
| R002 | ... | ... | U002 | H002 | H002 | V002 |
| R003 | ... | ... | U003 | H001 | H002 | V003 |
| R004 | ... | ... | U004 | H002 | H002 | V004 |
| ... | ... | ... | ... | ... | ... | ... |

Fig. 3A

VEHICLE MANAGEMENT DATA

| VEHICLE ID | STATE | CURRENT POSITION | VEHICLE DETAILS |
|---|---|---|---|
| V001 | DURING RENTAL | ... | ... |
| V002 | — | POINT A | ... |
| V003 | DURING RENTAL | ... | ... |
| V004 | — | POINT B | ... |
| ... | ... | ... | ... |

Fig. 3B

| DEMAND DATA | | | | | |
|---|---|---|---|---|---|
| DESIRED RENTAL DATE AND TIME | DESIRED RETURN DATE AND TIME | USER ID | DESIRED DEPARTURE POINT | DESIRED RETURN POINT | DESIRED VEHICLE TYPE |
| ... | ... | U001 | H001 | H001 | ... |
| ... | ... | U002 | H002 | H002 | ... |
| ... | ... | U003 | H001 | H002 | ... |
| ... | ... | U004 | H002 | H002 | ... |
| ... | ... | ... | ... | ... | ... |

Fig. 4

OPERATION DATA

- RESERVATION ID
- OPERATION SCHEDULED ROUTE OR PLACE OF DESTINATION
- NUMBER OF OCCUPANTS

Fig. 5

INFORMATION PROCESSING APPARATUS, INFORMATION PROCESSING METHOD, AND NON-TRANSITORY STORAGE MEDIUM

CROSS REFERENCE TO THE RELATED APPLICATION

This application claims the benefit of Japanese Patent Application No. 2020-076699, filed on Apr. 23, 2020, which is hereby incorporated by reference herein in its entirety.

BACKGROUND

Technical Field

The present disclosure relates to an information processing apparatus that manages the rental of vehicles.

Description of the Related Art

Car or vehicle sharing, a form of temporary vehicle rental to users, is increasing. In relation to this, Patent Literature 1 discloses a system for efficiently notifying a user of a return deadline of a rental vehicle.

CITATION LIST

Patent Literature

Patent Literature 1: Japanese Patent Application Laid-Open Publication No. 2004-295392

SUMMARY

In cases where vehicles are rented to users, the users are basically required to return the vehicles to departure points or locations. However, if a sufficient number of vehicles cannot be provided, returning rented vehicles to points different from the departure points may increase overall efficiency.

The present disclosure has been made in view of the above-mentioned circumstance, and is to improve the operation rate of vehicles in a system that rents vehicles to users.

An information processing apparatus according to a first aspect of the present disclosure is characterized by including: a controller configured to perform: generating a rental schedule of a vehicle for a first user; obtaining demand data related to a demand of the vehicle; and changing, based on the demand data, a vehicle return point included in the rental schedule, the vehicle return point being a point at which the first user returns the vehicle.

In addition, an information processing method according to a second aspect of the present disclosure is characterized by including: a step of generating a rental schedule of a vehicle for a first user; a step of obtaining demand data related to a demand of the vehicle; and a step of changing, based on the demand data, a vehicle return point included in the rental schedule, the vehicle return point being a point at which the first user returns the vehicle.

Moreover, as another aspect of the present disclosure, there can be mentioned a program for causing a computer to perform the above-described information processing method, or a computer readable storage medium storing the program in a non-transitory manner.

According to the present invention, in a system for renting vehicles to users, the operating rate of the vehicles can be improved.

BRIEF DESCRIPTION OF THE DRAWINGS

FIG. 3A and FIG. 3B is a diagram illustrating an example of reservation management data and vehicle management data;

FIG. 4 is a diagram illustrating an example of demand data;

FIG. 5 is a diagram illustrating an example of operation data;

DESCRIPTION OF THE EMBODIMENTS

Figure 1:
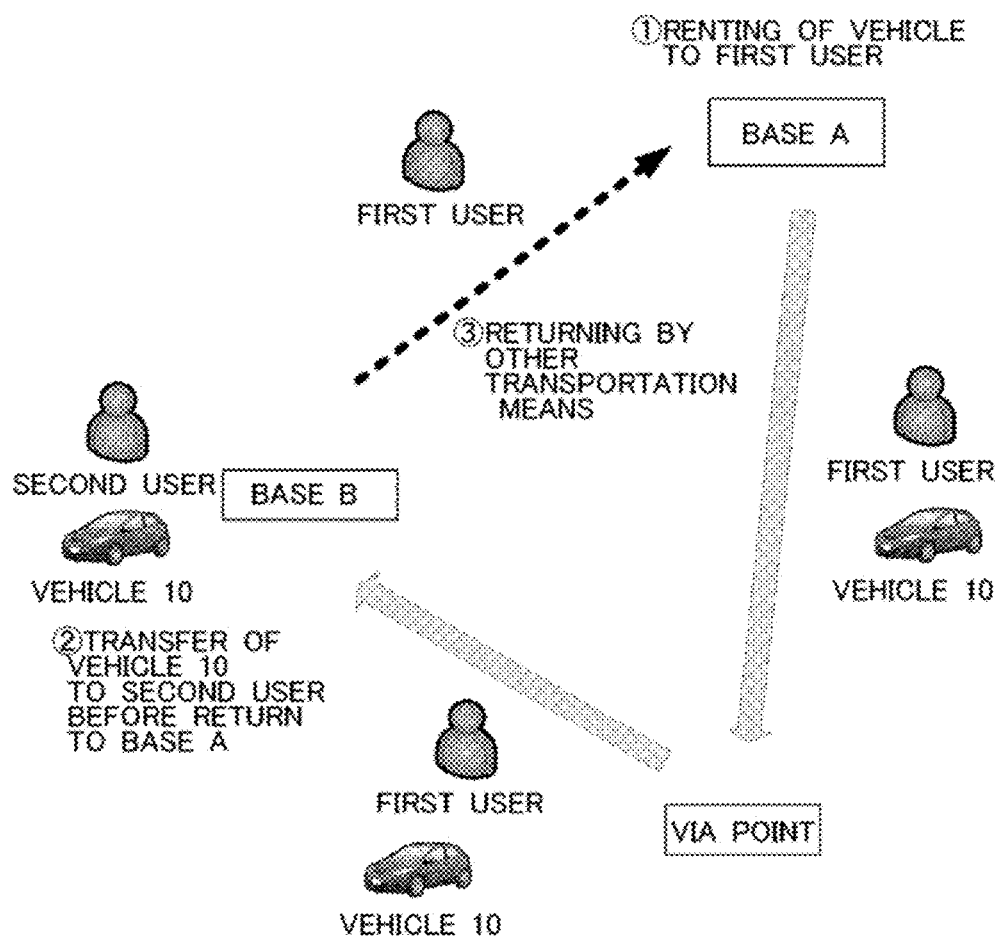
FIG. 1 is a view for explaining a change in a vehicle rental schedule.

An information processing apparatus according to an aspect of the present disclosure is an apparatus that manages the rental of sharing vehicles.

Specifically, the information processing apparatus includes a controller configured to perform: generating a rental schedule of a vehicle for a first user; obtaining demand data related to a demand of the vehicle; and changing, based on the demand data, a vehicle return point included in the rental schedule, the vehicle return point being a point at which the first user returns the vehicle.

The rental schedule is a schedule for renting a vehicle to the user. The rental schedule may include, for example, a rental date and time, a return date and time, a rental point (station) and a return point, of the vehicle.

After generating the rental schedule of the vehicle for the first user, the controller determines, based on the demand data, whether or not the point at which the first user returns the vehicle should be changed.

For example, there is a case where a demand for the vehicle is generated at a point where there is no direct relation with the first user, and a vehicle for responding to the demand cannot be prepared. In such a case, the controller makes a determination that the first user is made to return the vehicle at a point different from an initial schedule, and corrects the rental schedule of the vehicle, in order to rent the vehicle to a second user who desires to use the vehicle.

According to such an aspect, it is possible to realize optimization of a sharing system (e.g., an increase in profit, a reduction in cost, and so on).

Here, note that the demand data may be in any form as long as it is data indicating a demand for the vehicle for a user other than the first user. For example, it may be statistical data or may be a set of requests transmitted from specific users.

In addition, the controller may be characterized by determining, based on the demand data, a riding point of the second user to whom the vehicle will be rented after the first user returns the vehicle, and changing the vehicle return point to the riding point of the second user.

By setting the point at which the first user returns the vehicle to the point at which the second user gets in the vehicle, the vehicle can be transferred from the first user to the second user. Here, note that the point of transfer of the vehicle can be an unmanned location (such as a station or the like) or a manned location (such as a sales office or the like).

Moreover, the controller may be characterized by generating return data indicating an incentive to be given to the first user in the case where the vehicle return point is changed.

By giving an incentive to the first user, the first user can be motivated to change the vehicle return point. The incentive may include, for example, a discount amount for the rental of the vehicle.

Further, the incentive may include a transportation cost required for the first user to return the vehicle.

For example, the transportation cost for returning to the initially scheduled return point can be set as a part of the incentive for the first user. The transportation cost is a cost for moving a person and/or load (luggage, cargo, etc.) and is not necessarily a fare of public transportation. For example, the cost may be a delivery charge for loads, a usage charge of another sharing vehicle, or the like. Furthermore, a return destination of the first user does not necessarily have to be the initially scheduled return point.

In addition, the controller may be characterized by setting the transportation cost based on the number of loads loaded on the vehicle by the first user.

In cases where the user has loads loaded on the vehicle, it may be difficult for the user to get off the vehicle in the middle of the route. In order to cope with this, the transportation cost may be increased based on the amount or number of loads loaded on the vehicle as compared with the case where there is no load.

Moreover, the controller may be characterized by determining whether or not to change the vehicle return point, based on the result of comparison between the incentive and a profit to be increased by renting the vehicle to the second user.

For example, in cases where the profit to be increased by renting the vehicle to the second user is larger than the incentive to be paid to the first user, it is preferable to change the vehicle return point.

Further, the controller may be characterized by determining a combination of the first user and the second user based on a distance from a predicted route of the vehicle to the riding point of the second user.

This is because the vehicle can be delivered to the second user at a lower cost as the predicted route of the vehicle and the riding point of the second user are closer to each other.

Furthermore, the controller may be characterized by reserving a second vehicle to which the first user will transfer, when it is determined to change the vehicle return point.

By reserving the second vehicle, the first user can continue to travel in the vehicle. The second vehicle may be a vehicle at or near the riding point of the second user. In addition, in cases where the second vehicle is an autonomous driving vehicle, the second vehicle may be directed to a second departure point.

Still further, the controller may be characterized in that in cases where at the riding point of the second user, there is a second vehicle that is unable to meet the demand of the second user but is able to be transferred by the first user, the vehicle return point is changed and the second vehicle is reserved for the first user.

For example, in cases where at the second departure point, there is a vehicle that can be taken by the first user but cannot meet the demand of the second user (due to constraints such as capacity and load), the vehicle may be allowed to be used by the first user.

Hereinafter, embodiments of the present disclosure will be described based on the accompanying drawings. The configurations of the following embodiments are examples, and the present disclosure is not limited to the configurations of the embodiments.

First Embodiment

An overview of a vehicle sharing system according to a first embodiment will be described with reference to FIGS. 1 and 2. The vehicle sharing system according to the present embodiment is a system in which vehicles can be rented at a plurality of bases (stations).

The system is configured to include a server device 100 that manages the rental of vehicles 10, an in-vehicle device 200 mounted in each vehicle 10, and a user terminal 300 carried by each user.

In the system according to the present embodiment, a user terminal 300 accesses the server device 100 and reserves a vehicle 10. The vehicle 10 belongs to any one of the bases, and the in-vehicle device 200 authenticates the user terminal 300 to allow the user to get in the vehicle 10.

Figure 2:
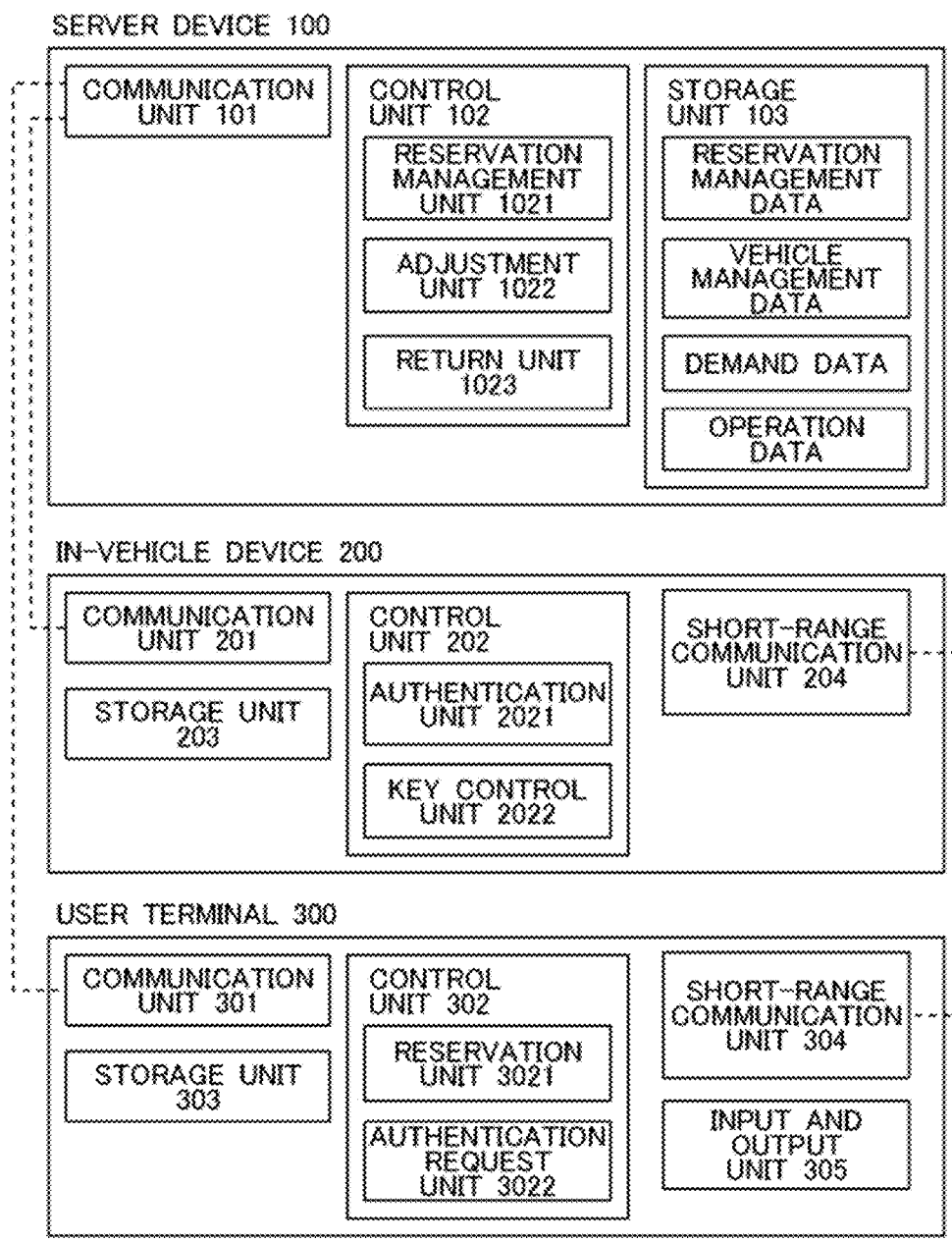
FIG. 2 is a block diagram schematically illustrating an example of components included in a system.

In the example of FIG. 1, it is assumed that a first user has rented a vehicle 10 belonging to base A and has made a reservation to return the vehicle to the base A by a predetermined return date and time.

Here, it is also assumed that a new demand by the second user has occurred at base B.

In this case, in cases where there is no vehicle at the base B that can meet the demand of the second user, a request of the second user must be rejected in principle. However, in cases where the first user allows the vehicle to be returned at the base B, the vehicle 10 can be handed over from the first user to the second user at the base B.

In this manner, the server device 100 according to the present embodiment matches the first user who is receiving the rental of the vehicle 10 with the second user who desires to rent the vehicle 10, thereby changing the rental schedule of the vehicle so as to maximize profits. Further, a user who agrees to change the rental schedule (i.e., return the vehicle on the way of the route) will be given a commensurate incentive.

The components of the system will be described in detail. FIG. 2 is a block diagram schematically illustrating an example of the configurations of the server device 100, the in-vehicle apparatus 200, and the user terminal 300 illustrated in FIG. 1.

The server device 100 is an information processing apparatus that manages a plurality of vehicles 10. The server device 100 receives a reservation for a vehicle 10 in response to a request from the user terminal 300. In addition, information related to the user who has made the reservation is transmitted to the in-vehicle device 200 mounted in the corresponding vehicle 10. This allows the in-vehicle device 200 to authenticate the user terminal 300.

The server device 100 can be composed of a general-purpose computer. That is, the server device 100 can be configured as a computer that includes a processor such as a CPU, a GPU or the like, a main storage device such as a RAM, a ROM or the like, and an auxiliary storage device such as an EPROM, a hard disk drive, a removable medium or the like. Here, note that the removable medium may be, for example, a USB memory or a disk recording medium such as a CD, a DVD or the like. An operating system (OS), various kinds of programs, various kinds of tables and so on are stored in the auxiliary storage device, and by executing the programs stored in the auxiliary storage device, it is possible to achieve each function that meets a predetermined purpose, as will be described later. However, a part or all of the functions may be realized by a hardware circuit such as an ASIC, an FPGA or the like.

The server device 100 includes a communication unit 101, a control unit 102, and a storage unit 103.

The communication unit 101 is a communication means or unit for connecting the server device 100 to a network. In the present embodiment, the communication unit 101 can communicate with the in-vehicle device 200 and the user terminal 300 via a network by making use of a mobile communication service such as 4G, LTE or the like.

The control unit 102 is a means or unit that manages the control of the server device 100. The control unit 102 is composed of a CPU, for example.

The control unit 102 includes, as its functional modules, a reservation management unit 1021, an adjustment unit 1022, and a return unit 1023. Each functional module may be realized by the CPU executing a program(s) stored in a storage unit such as a ROM or the like.

The reservation management unit 1021 manages reservations for a plurality of vehicles 10 that are under the management of the system. Specifically, when a new reservation request is received from the user terminal 300, it is determined whether or not a vehicle can be rented under a designated condition, by referring to reservation management data and vehicle management data, which will be described later. In cases where the vehicle can be rented, a reservation is established, and the user terminal 300 is notified to that effect, and at the same time, data indicating the content of the reservation is transmitted to the in-vehicle device 200 mounted in the reserved vehicle 10.

When a reservation request, which cannot be immediately responded, is received from a user terminal 300 carried by a certain user, the adjustment unit 1022 secures or obtains a vehicle by adjusting the content of a reservation related to another user. A specific method for such an adjustment will be described later.

The return unit 1023 gives an incentive to the user who has cooperated with the reservation adjustment. The method of calculating an amount of money for the incentive will be described later.

The storage unit 103 is a means or unit for storing information, and is composed of a storage medium such as a RAM, a magnetic disk, a flash memory, or the like. The storage unit 103 stores various kinds of programs, data and the like to be executed by the control unit 102.

In addition, the following data is stored in the storage unit 103:
(1) data for managing a plurality of reservations (reservation management data);
(2) data for managing a plurality of vehicles (vehicle management data);
(3) data for managing reservations at a request stage (demand data); and
(4) data related to the operation routes of vehicles being rented (operation data).

The reservation management data is data for managing the determined reservations. FIG. 3A illustrates an example of the reservation management data. In the reservation management data, the rental date and time of each vehicle, the return date and time thereof, the identifier of each user, the departure point (i.e., the point where each vehicle is rented), the return point (i.e., the point where each vehicle is returned), the identifier of each vehicle, the identifier of each reservation, and so on are recorded. The reservation management data is generated based on each reservation request.

The vehicle management data is data for managing a plurality of vehicles 10. FIG. 3B illustrates an example of the vehicle management data. An identifier, a state, a current position, detailed vehicle information and so on of each vehicle are recorded in the vehicle management data. The vehicle management data is appropriately updated based on the information collected from the in-vehicle device 200 mounted in each vehicle 10.

The demand data is data that records a demand for each vehicle by each user. In the present embodiment, the demand data is data for managing reservations at the request stage. That is, the demand data is generated when there is no vehicle that can respond to a reservation request. FIG. 4 illustrates an example of the demand data. The desired rental date and time, the desired return date and time, the identifier of each user, the desired departure point, the desired return point, the desired vehicle type, and so on of each vehicle are recorded in the demand data.

The operation data is data related to an operation route of each vehicle being rented. FIG. 5 illustrates an example of the operation data. In the operation data, for example, the identifier of each reservation, the operation route or the destination of each vehicle 10, the area where an operation of each vehicle 10 is scheduled, and so on are recorded. Here, note that the operation data may include data that is not related to the operation route of each vehicle (e.g., the number of occupants, the number or amount of loads, or the like). The operation data is generated by the in-vehicle device 200 at the time of the departure of each vehicle 10.

Next, the in-vehicle device 200 will be described. The in-vehicle device 200 has a function of authenticating a user terminal 300 by performing short-range wireless communication with the user terminal 300, and a function of locking and unlocking an electronic lock based on the result of the authentication of the user terminal 300. The in-vehicle device 200 is configured to include a communication unit 201, a control unit 202, a storage unit 203, and a short-range communication unit 204.

The communication unit 201 is a means or unit that communicates with the server device 100 by using the same communication standard as the communication unit 101.

The control unit 202 is a module that performs control for authenticating a user terminal 300 through short-range wireless communication with the user terminal 300, and also performs control for locking and unlocking the electronic lock based on the result of the authentication. The control unit 202 is composed of a microcomputer, for example.

The control unit 202 includes, as its functional modules, an authentication unit 2021 and a key control unit 2022. Each of the functional modules may be realized by a CPU executing a program(s) stored in a storage unit (ROM or the like).

The authentication unit 2021 performs the authentication of the user terminal 300 based on information transmitted from the server device 100 and information transmitted from the user terminal 300.

Specifically, the authentication unit 2021 obtains in advance from the server device 100 data for authenticating the user who has reserved the vehicle. In addition, the authentication unit 2021 obtains user information from the user terminal 300 via the short-range communication unit 204, and determines that the authentication has succeeded, in cases where the data and the user information match with each other. On the other hand, in cases where they do not match, it is determined that the authentication has failed. In cases where the authentication unit 2021 has succeeded in the authentication of the user terminal 300, a command for locking and unlocking is transmitted to the key control unit 2022, which will be described later.

The key control unit 2022 controls the electronic lock of the vehicle based on the command transmitted from the authentication unit 2021.

The storage unit 203 is a means or unit for storing information, and is composed of a storage medium such as a RAM, a magnetic disk, a flash memory or the like. The storage unit 203 stores authentication information for matching with an electronic key transmitted from each user terminal 300, various kinds of programs, data or the like to be executed by the control unit 202.

The short-range communication unit 204 is an interface for performing short-range wireless communication with the in-vehicle device 200. The short-range communication unit 204 performs communication in a short range (about several centimeters) using a predetermined wireless communication standard.

In the present embodiment, the short-range communication unit 204 performs data communication according to the NFC standard (Near Field Communication). Here, note that the NFC is mentioned as an example in the present embodiment, but other wireless communication standards can also be used. For example, Bluetooth (registered trademark), UWB (Ultra Wideband), Wi-Fi (registered trademark) or the like may be used.

Here, note that the in-vehicle device 200 may have a function(s) other than the exemplified functions. The in-vehicle device 200 may be configured to perform, for example, a function of navigation or a function related to the reservation of a vehicle (e.g., a function of making a notification of a return deadline or an extension procedure).

Next, the user terminal 300 will be described.

The user terminal 300 is, for example, a smart phone, a mobile phone, a tablet terminal, a personal information terminal, or a small computer such as a wearable computer (e.g., a smart watch or the like). The user terminal 300 includes a communication unit 301, a control unit 302, a storage unit 303, a short-range communication unit 304, and an input and output unit 305.

The communication unit 301 is, similarly to the communication unit 201, a communication interface for communicating with the server device 100 via a network.

The control unit 302 is a means or unit that controls the user terminal 300. The control unit 302 is composed of a microcomputer, for example. The control unit 302 may achieves its functions by causing a CPU to execute a program(s) stored in the storage unit 303, which will be described later.

The control unit 302 includes, as its functional modules, a reservation unit 3021 and an authentication request unit 3022. Each of the functional modules may be realized by a CPU executing a program(s) stored in a storage unit (ROM or the like).

The reservation unit 3021 reserves a vehicle 10 by accessing the server device 100 based on the information obtained from the user. Specifically, the reservation unit 3021 obtains the desired rental date and time of the vehicle, the desired return date and time thereof, the identifier of the user, the desired departure point, the desired return point, the desired vehicle type, and the like via the input and output unit 305 that will be described later, generates a reservation request, and transmits the reservation request to the server device 100.

The authentication request unit 3022 generates a request for locking or unlocking the vehicle 10 based on an operation performed by the user, and transmits the request to the in-vehicle device 200 through short-range wireless communication. For example, the authentication request unit 3022 outputs an interface screen for locking and unlocking to the input and output unit 305 (e.g., a touch panel display or the like) to be described later, generates data for requesting locking or unlocking (a locking/unlocking request) based on the operation performed by the user, and transmits the data to the in-vehicle device 200. The locking/unlocking request includes user information.

The storage unit 303 is a means or unit for storing information, and is composed of a storage medium such as a RAM, a magnetic disk, a flash memory or the like. The storage unit 303 stores various kinds of programs, data and the like to be executed by the control unit 302.

The short-range communication unit 304 is a means or unit that communicates with the user terminal 300 according to the same communication standard as that of the short-range communication unit 204.

The input and output unit 305 is a means or unit that receives an input operation performed by the user, and presents information to the user. Specifically, the input and output unit 305 is composed of a touch panel with its control unit, and a liquid crystal display with its control unit. In the present embodiment, the touch panel and the liquid crystal display are formed of a single touch panel display.

Figure 6:
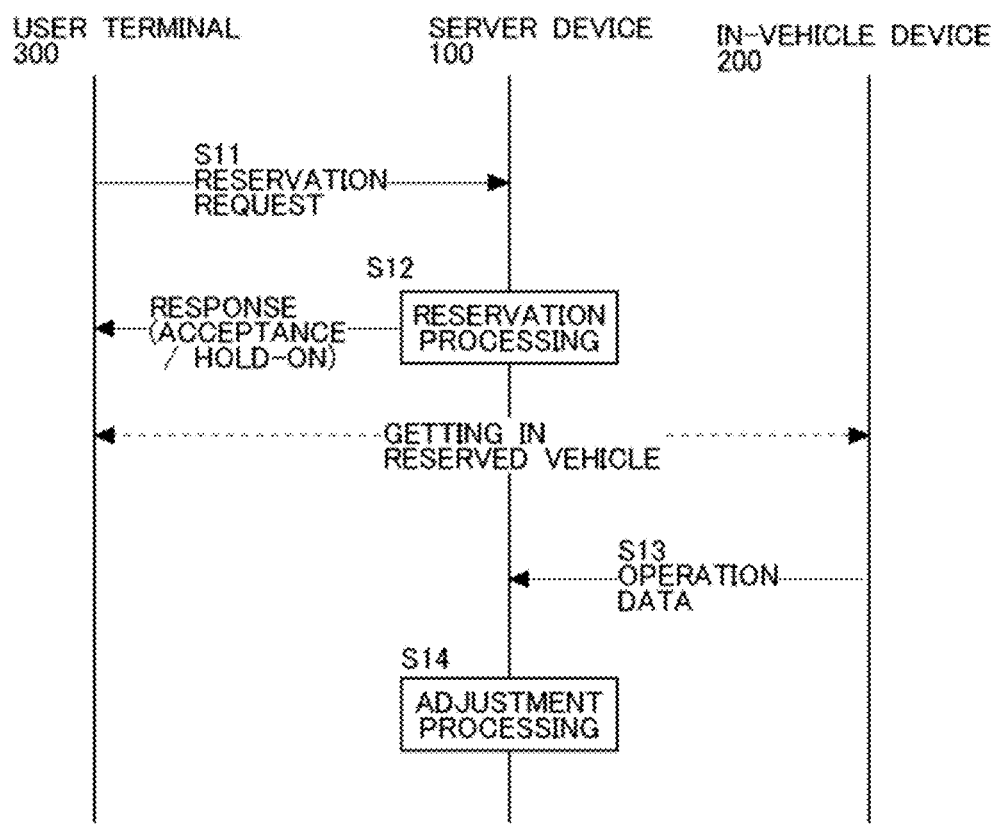
FIG. 6 is a diagram illustrating the flow of data to be transmitted and received between the components included in the system.

Next, data to be transmitted and received by each component included in the system will be described with reference to FIG. 6.

When a user, who desires to use the vehicle 10, performs a reservation operation via a user terminal 300, the user terminal 300 (i.e., the reservation unit 3021) generates a reservation request and transmits it to the server device 100 (step S11).

The server device 100 (i.e., the reservation management unit 1021), which has received the reservation request, performs the processing of reserving the vehicle 10 and returns a result thereof to the user terminal 300 (step S12).

When the vehicle 10 can be reserved, the reservation management unit 1021 returns an acceptance response.

On the other hand, when the vehicle 10 cannot be reserved (i.e., the vehicle 10 is not available), the reservation management unit 1021 returns a notification that the reservation cannot be made, and confirms whether or not the request should be put on hold. In cases where the user puts the request on hold, the system keeps the reservation request, and tries to adjust the reservation content (to be described later). The reservation request on hold is reflected in the demand data. Here, note that the demand data may have a storage period (an expiration deadline) associated with it. In this case, the reservation request whose deadline has passed may be deleted.

When the user gets in the reserved vehicle 10, the in-vehicle device 200 transmits operation data to the server device 100 (step S13).

The operation data is data related to an operation route of the vehicle 10, and typically includes a scheduled route, via points, a destination, a traveling area, and so on of the vehicle 10. For example, in cases where the in-vehicle device 200 has a navigation function, the operation route or the destination can be obtained from the in-vehicle device 200, and used as the operation data.

In the present embodiment, the server device 100 adjusts the reservation content for the vehicle 10 that has already departed, by referring to the operation data thereof. For example, a determination is made to have a first user return the vehicle 10 at a point on the route in order for a second user to use the vehicle 10.

Here, note that the operation data may include information other than the information related to the operation route. For example, such information may include the number of persons riding in the vehicle 10, the number and/or amount of loads (cargo, luggage, etc.) loaded therein, or the like. Such information may be generated based on data obtained from a sensor provided in the vehicle 10, or may be inputted by the user via the in-vehicle device 200.

The server device 100 periodically performs the adjustment of the reservation content based on the reservation management data, the operation data, and the demand data (step S14).

In this step, it is determined whether or not it is appropriate to rent the vehicle 10 already rented to the first user to the second user on the way, and when it is appropriate, the vehicle return point of the vehicle 10 is changed with the consent of the first user. In addition, an incentive is generated for the first user. The processing to be performed in step S14 will be described later.

Figure 7:
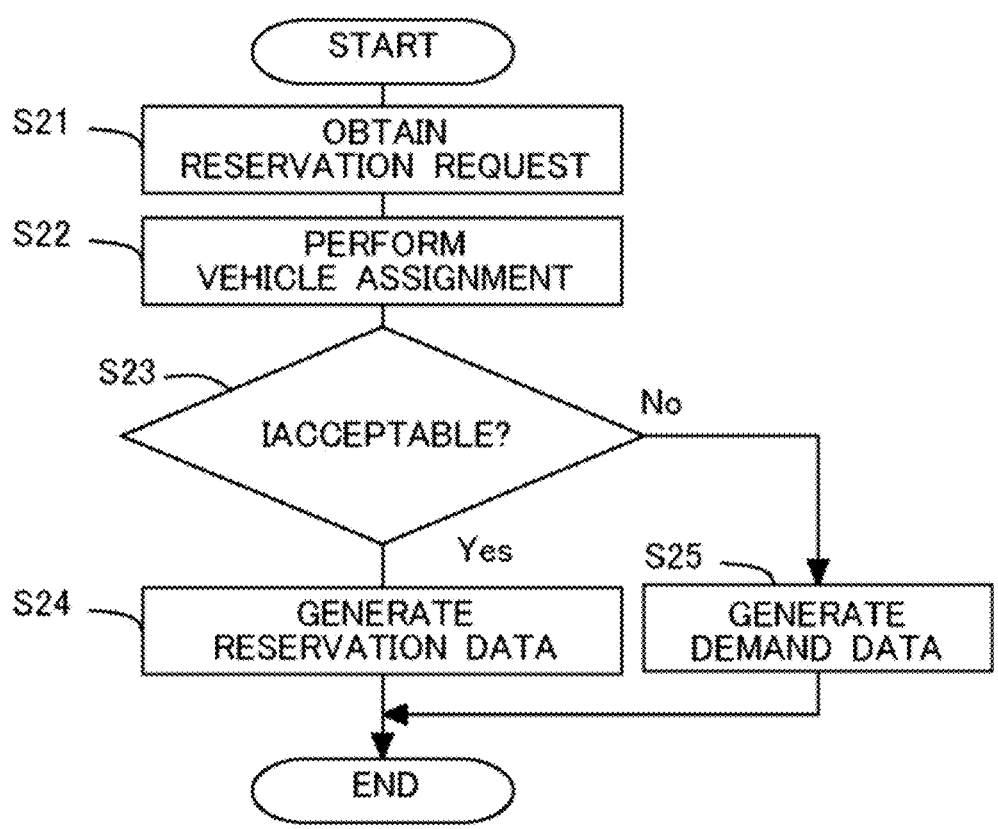
FIG. 7 is a flowchart of reservation processing to be performed by a server device.

Next, the processing (step S12) to be performed when a user makes a reservation for a vehicle will be described in more detail. FIG. 7 is a flowchart of the processing to be performed by the server device 100 (i.e., the reservation management unit 1021).

First, in step S21, a reservation request is obtained from a user terminal 300. The reservation request includes, for example, a desired rental date and time, a desired return date and time, an identifier of a user, a desired departure point, a desired return point, a desired vehicle type, and so on of a vehicle.

Then, vehicle assignment is made in step S22. Specifically, by referring to the vehicle management data and the reservation management data, an attempt is made to secure a vehicle that matches the desire of the user.

In step S23, it is determined whether or not the assignment of the vehicle has succeeded. Here, in cases where the assignment of the vehicle has been successful, the processing or routine proceeds to step S24, where a new record is added to the reservation management data. In addition, a notification is provided to the user terminal 300 that the reservation has been completed.

In cases where the assignment of the vehicle could not be performed, the processing proceeds to step S25, where a new record is added to the demand date. Here, note that this step may be performed after confirming the intention of the user.

Figure 8:
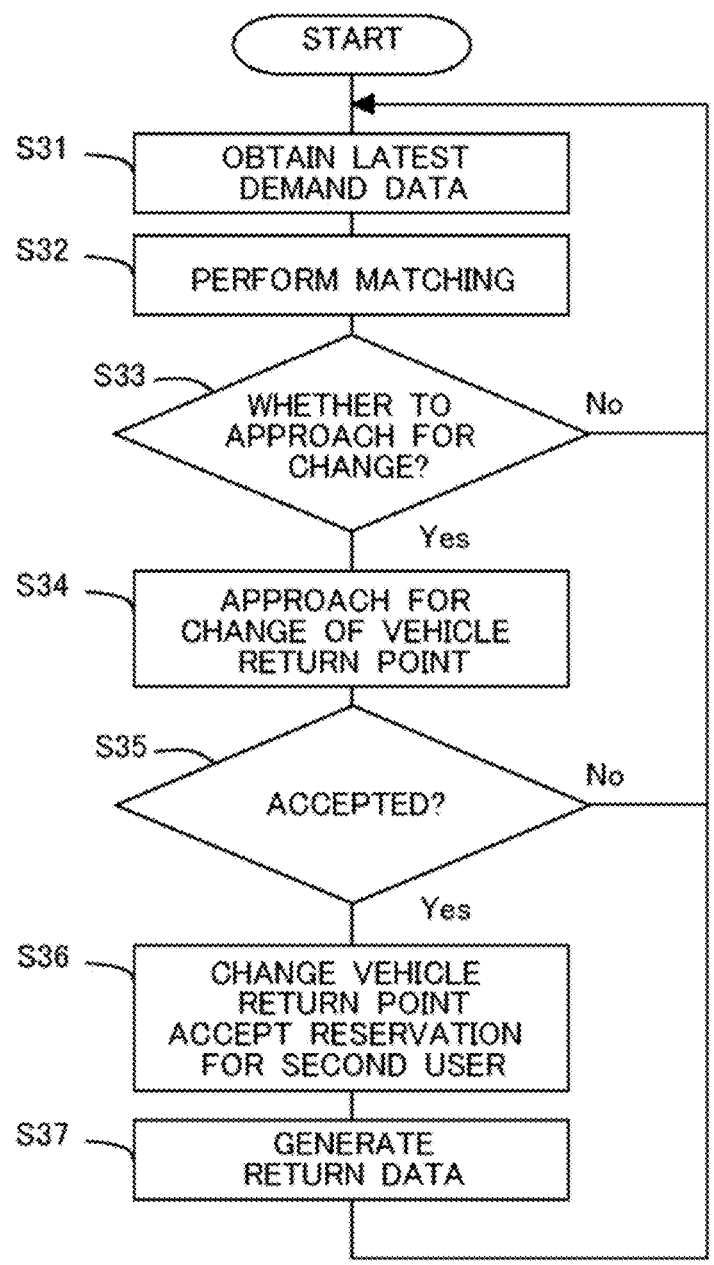
FIG. 8 is a flowchart of adjustment processing to be performed by the server device.

Then, the processing in which the server device 100 adjusts the reservation content (step S14) will be described in more detail. FIG. 8 is a flowchart of the processing to be performed by the server device 100 (the adjustment unit 1022).

First, in step S31, the latest demand date is obtained. Thus, the reservation request on hold is obtained.

Then, in step S32, a matching between the first user (i.e., the user to whom the vehicle 10 is rented) and the second user (i.e., the user for whom the reservation of the vehicle 10 is put on hold) is made. Specifically, the following processes are performed for the vehicle 10 that has already been rented:

(1) It is determined whether or not the reservation request of the second user included in the demand data can be met by changing the return point of the vehicle 10 already rented to the first user;

(2) An incentive to be given to the first user in order to change the return point is calculated; and (3) A change in profit in the case of changing the return point is calculated.

Then, these factors are combined to determine whether or not to match the first user with the second user (i.e., whether or not to change the return point of the vehicle 10 that is being rented to the first user).

Figure 9:
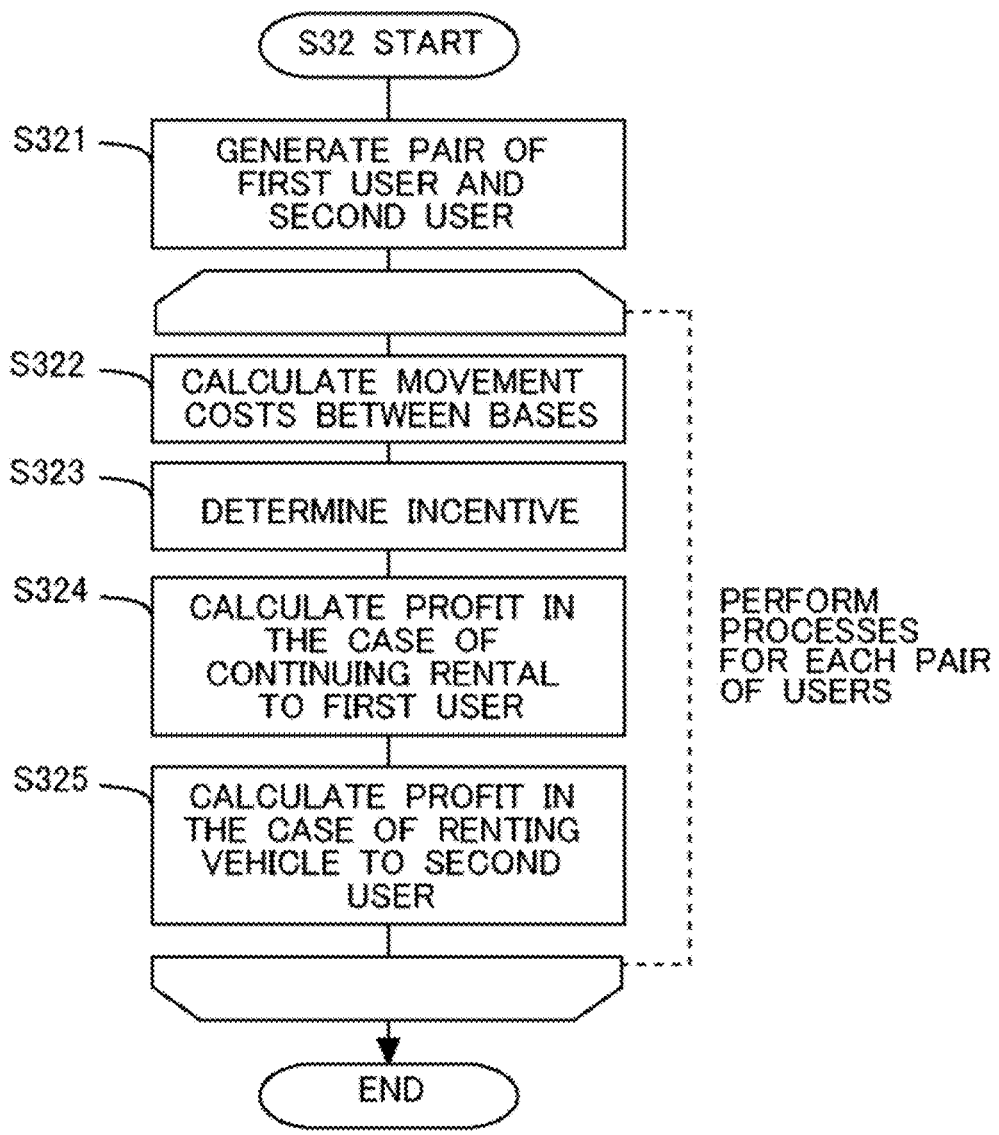
FIG. 9 is a flowchart of processing of making a matching between a first user and a second user.

FIG. 9 is a flowchart illustrating the processing performed in step S32 in more detail.

First, in step S321, pairs of first and second users are generated. Specifically, it is determined whether or not there is a first user who can satisfy the demand of a second user, by matching one or more reservation requests corresponding to the second user with one or more pieces of operation data corresponding to the vehicle 10 currently operated by the first user.

Figure 10:
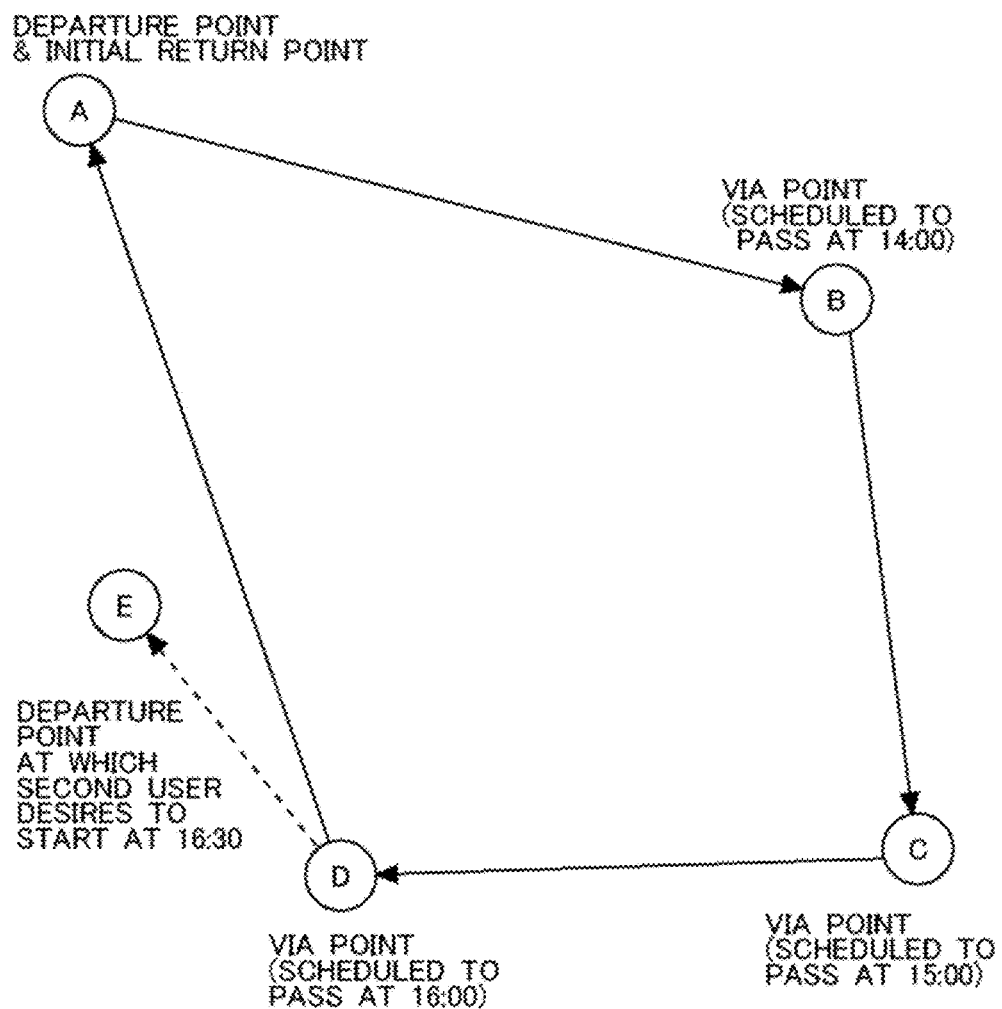
FIG. 10 is a diagram illustrating a specific example of an operation route of a vehicle.

FIG. 10 is a view illustrating an operation route of a vehicle scheduled by the first user. In this example, it is illustrated that the first user to whom the vehicle has been rented at point A returns to the point A via point B, point C and point D.

Here, it is assumed that the second user has entered a reservation request with point E as a desired departure point. In this case, the vehicle can be rented to the second user by having the first user, who is passing through the vicinity of the point E, head to the point E and return the vehicle 10 at the point E. In step S321, such a set of users is generated.

In step S321, for example, a combination of a first user and a second user satisfying the following conditions is extracted based on the reservation management information, the demand information, and the operation information:

(1) The vehicle 10 in which the first user rides passes through the vicinity of the desired departure point of the second user (for example, the distance between the route of the vehicle 10 and the desired departure point of the second user is equal to or less than a predetermined value); and (2) The time of the passage of the vehicle 10 is near before or after the desired departure time of the second user.

The processes in steps S322 through S325 are performed for each combination of users generated.

In step S322, a cost required for the first user to travel or move between bases is calculated. Specifically, the cost required for moving from the point where the vehicle 10 is handed over to the second user to the original return point is calculated. The cost required for the movement may be, for example, the fare for public transportation or the usage fees for other mobility services. The server device 100 may be configured to be able to store or obtain data for calculating these costs. The cost for the movement may be determined based on the number of persons in the vehicle 10.

In step S323, an incentive to be given to the first user is determined. The incentive may be, for example, a discount amount for the rental fee of the vehicle 10 or points that can be used for other services. The amount of the incentive is preferably an amount corresponding to the disadvantage of the first user. For example, the incentive may be increased as the remaining time until the scheduled return time is longer, or the incentive may be increased as the distance from the point at which the vehicle 10 is handed over to the second user to the original return point is longer.

In the present embodiment, the cost calculated in step S322 plus a certain amount is set as the incentive to be given to the first user, but the calculation of the incentive may be performed in any manner as long as it is based on the cost calculated in step S322.

In step S324, a profit (first profit) in the case where the vehicle 10 is continuously rented to the first user, i.e., in the case where the vehicle 10 is not rented to the second user, is calculated.

In step S325, a profit (second profit) in the case where the first user is allowed to return the vehicle 10 with the incentive given to the first user, and the vehicle 10 is rented to the second user is calculated.

Here, it is understood that in cases where the second profit exceeds the first profit, an overall profit is improved by handing over the vehicle 10 from the first user to the second user.

Referring back to FIG. 8, the description will be continued.

In step S33, based on the result calculated in step S32, it is determined whether or not to approach the first user to change the vehicle return point. For example, in cases where there is a combination of users for which the second profit is greater than the first profit, a determination is made to the effect that a corresponding first user will be approached to change the vehicle return point. On the other hand, in cases where there is no combination of users, the processing returns to step S31.

In cases where the determination is affirmative in step S33, the processing proceeds to step S34, where the first user is approached to change the vehicle return point. Specifically, the changed vehicle return point, the changed return time, the content of the incentive, and the like are sent to the user terminal 300 carried by the first user, so that a consent is obtained from the first user.

Here, in cases where the consent is obtained (YES in step S35), the processing proceeds to step S36. On the other hand, in cases where no consent is obtained (NO in step S35), the processing returns to step S31.

In step S36, the following processes are performed in order to establish the reservation of the second user:

(1) The return point and the return date and time are changed for the reservation management data corresponding to the first user;

(2) The record of the demand data corresponding to the second user is deleted, and a record of the reservation management data is newly created; and (3) The user terminal 300 carried by the second user is notified to the effect that the reservation has been established (i.e., the vehicle 10 will be returned to the base desired by the second user).

Thus, the reservation of the vehicle 10 for the second user is established.

In step S37, return data indicating the incentive to be given to the first user is generated. The return data is temporarily stored and then transmitted at a predetermined timing to an external service that manages points, electronic money, etc.

Here, note that in the processing of step S32, in cases where there are a plurality of candidates for the second user with respect to a certain first user, the second user may be selected based on a predetermined criterion. For example, the second user with the highest overall profit may be selected.

In addition, in cases where there are a plurality of pairs of first and second users, the processes of steps S33 through S37 may be performed for each pair.

As described above, according to the first embodiment, it is possible to meet the demand of a second user by changing the return point of a vehicle rented to a first user, thus making it possible to improve the profit of a service provider. Further, by providing an incentive to the first user, it is possible to draw out the cooperation of the first user.

Second Embodiment

In the first embodiment, the incentive to be given to the first user is calculated based on the movement or travel cost between the bases. A second embodiment is an embodiment in which, in addition to this, the incentive to be given to the first user is determined further based on an amount of load (cargo, luggage, etc.) loaded on the vehicle 10.

In the second embodiment, operation data includes information related to the amount and/or number of loads loaded on the vehicle 10. The information may be obtained by a sensor provided in the vehicle 10, or may be inputted or entered by a person in charge when the renting of the vehicle 10 is manually performed.

In addition, in the second embodiment, the amount of the incentive to be given to the first user is determined further based on the information related to the amount or the number of loads. For example, in step S322, usage fees for transportation services for sending the loads between the bases may be calculated, and the amount of the incentive including the fees may be determined. Alternatively, the amount of the incentive itself may be increased as the amount or number of loads increases.

Third Embodiment

A third embodiment is an embodiment in which, when the return point of the vehicle 10 rented to the first user is changed, another vehicle to which the first user is allowed to transfer is reserved.

One of the reasons why the reservation by the second user is not established is because of the category (size, model, capacity, etc.) of the vehicle. For example, there is a case where the second user may have requested a vehicle that can accommodate six persons, but only a five-seater vehicle is available at the base.

In such a case, there may be another vehicle to which the first user can transfer at a changed vehicle return point.

In the third embodiment, in step S36, it is determined whether or not another vehicle (hereinafter, referred to as a vehicle 10B) is available at the changed vehicle return point. Then, in cases where the vehicle 10B is available and the first user can take it, the vehicle 10B is reserved for the first user in an automatic manner. The case where the first user can take the vehicle is, for example, a case where all the persons in the vehicle 10 can ride in the vehicle 10B, or a case where all the loads (cargo, luggage or the like) on the vehicle 10 can be loaded into the vehicle 10B.

According to the third embodiment, the first user can transfer from the vehicle 10 to the vehicle 10B at the changed vehicle return point. That is, it is possible to suppress the cost for movement or travel by public transportation.

(Modifications)

The above-described embodiments are merely examples, and the present invention can be appropriately modified and implemented within a range not departing from the gist thereof.

For example, the processes, units, devices and the like explained in this disclosure can be implemented in various combinations thereof, as long as technical inconsistency does not occur.

In addition, the description of the embodiments, reservation requests put on hold are used as demand data, but the demand for a vehicle may be obtained by means of other methods. For example, data representing the demand for a vehicle may be obtained via a network from a device that provides another vehicle dispatch service or the like.

Further, the demand for a vehicle may not be associated with a particular user. For example, when it is determined that the rental demand for a vehicle 10 is increasing at a certain base, the processing illustrated in FIGS. 8 and 9 may be performed without specifying a second user. In this case, a change in profit may be calculated by estimation.

Moreover, in the description of the embodiments, a matching between a first user and a second user is performed based on operation data (i.e., data related to the operation route of a vehicle 10), but the operation data may not necessarily be generated. For example, position information may be periodically collected from the in-vehicle device 200 mounted on the vehicle 10, and the first user and the second user may be matched based on the collected position information or a movement or travel route of the vehicle 10 estimated based on the position information.

Further, in the description of the embodiments, the reservation content is adjusted after the first user has departed, but the reservation content may be adjusted before the first user rents the vehicle 10. For example, after the first user has reserved the vehicle 10, a combination of candidate vehicle return points and incentives may be presented to the first user, suggesting that the vehicle return point be changed.

In addition, the processing described as being performed by a single device or unit may be shared and performed by a plurality of devices or units. Alternatively, the processing described as being performed by different devices or units may be performed by a single device or unit. In a computer system, it is possible to flexibly change the hardware configuration (server configuration) that can achieve each function of the computer system.

The present disclosure can also be realized by supplying to a computer a computer program in which the functions described in the above-described embodiments are implemented, and reading out and executing the program by means of one or more processors included in the computer. Such a computer program may be provided to the computer by a non-transitory computer readable storage medium that can be connected to a system bus of the computer, or may be provided to the computer via a network. The non-transitory computer readable storage medium includes, for example, any type of disk such as a magnetic disk (e.g., a floppy (registered trademark) disk, a hard disk drive (HDD), etc.), an optical disk (e.g., a CD-ROM, a DVD disk, a Blu-ray disk, etc.) or the like, a read-only memory (ROM), a random-access memory (RAM), an EPROM, an EEPROM, a magnetic card, a flash memory, an optical card, any type of medium suitable for storing electronic commands.

What is claimed is:

1. An information processing apparatus including a controller configured to perform:
    generating a rental schedule of a vehicle for a first user, wherein the rental schedule includes a vehicle return point which is a point at which the first user returns the vehicle;
    obtaining operation data regarding an operation route from an in-vehicle device of the vehicle that has already departed from the riding point of the first user;
    obtaining, from a memory, demand data related to a demand of the vehicle;
    based on the demand data, determine a riding point of a second user that will rent the vehicle after the first user, wherein the riding point of the second user is different from the vehicle return point of the first user and a distance between the riding point of the second user and the return point of the first user is equal to or less than a predetermined value;
    changing, based on the demand data and the operation data, the vehicle return point included in the rental schedule to the riding point of the second user; and
    transmitting the changed vehicle return point to a user terminal of the first user before the first user returns the vehicle.

2. The information processing apparatus according to claim 1, wherein
    the controller generates return data indicating an incentive to be given to the first user when the vehicle return point is changed.

3. The information processing apparatus according to claim 2, wherein
    the incentive includes a discount amount for the rental of the vehicle.

4. The information processing apparatus according to claim 2, wherein
    the incentive includes a transportation cost required for the first user to return.

5. The information processing apparatus according to claim 4, wherein
    the controller sets the transportation cost based on a number of loads loaded in the vehicle by the first user.

6. The information processing apparatus according to claim 2, wherein
    the controller determines whether or not to change the vehicle return point, based on a result of comparison between the incentive and a profit increased by renting the vehicle to the second user.

7. The information processing apparatus according to claim 1, wherein
    the controller determines a combination of the first user and the second user based on a distance from a predicted route of the vehicle to the riding point of the second user.

8. The information processing apparatus according to claim 1, wherein
    the controller reserves a second vehicle for the first user to take over, in the case of determining to change the vehicle return point.

9. The information processing apparatus according to claim 1, wherein
    in cases where there is a second vehicle at the riding point of the second user which cannot meet the demand of the second user and to which the first user can transfer, the controller changes the vehicle return point and reserves the second vehicle for the first user.

10. An information processing method comprising:
    a step of generating a rental schedule of a vehicle for a first user, wherein the rental schedule includes a vehicle return point which is a point at which the first user returns the vehicle;
    a step of obtaining operation data regarding an operation route from an in-vehicle device of the vehicle that has already departed from the riding point of the first user;
    a step of obtaining, from a memory, demand data related to a demand of the vehicle;
    a step of, based on the demand data, determining a riding point of a second user that will rent the vehicle after the first user, wherein the riding point of the second user is different from the vehicle return point of the first user and a distance between the riding point of the second user and the return point of the first user is equal to or less than a predetermined value;

a step of changing, based on the demand data and the operation data, the vehicle return point included in the rental schedule to the riding point of the second user; and a step of transmitting the changed vehicle return point to a user terminal of the first user before the first user returns the vehicle.

11. The information processing method according to claim 10, further comprising:

generating return data that indicates an incentive to be given to the first user, in the case of changing the vehicle return point.

12. The information processing method according to claim 11, wherein the incentive includes a discount amount for the rental of the vehicle.

13. The information processing method according to claim 11, wherein the incentive includes a transportation cost required for the first user to return.

14. The information processing method according to claim 13, further comprising:

setting the transportation cost based on a number of loads loaded in the vehicle by the first user.

15. The information processing method according to claim 11, further comprising:

determining whether or not to change the vehicle return point, based on a result of comparison between the incentive and a profit that is increased by renting the vehicle to the second user.

16. The information processing method according to claim 10, further comprising:

determining a combination of the first user and the second user based on a distance from a predicted route of the vehicle to the riding point of the second user.

17. The information processing method according to claim 10, further comprising:

reserving a second vehicle to which the first user is to transfer, when it is determined that the vehicle return point is to be changed.

18. A non-transitory storage medium storing a program for causing a computer to execute the information processing method according to claim 10.

* * * * *